Figure 1A:
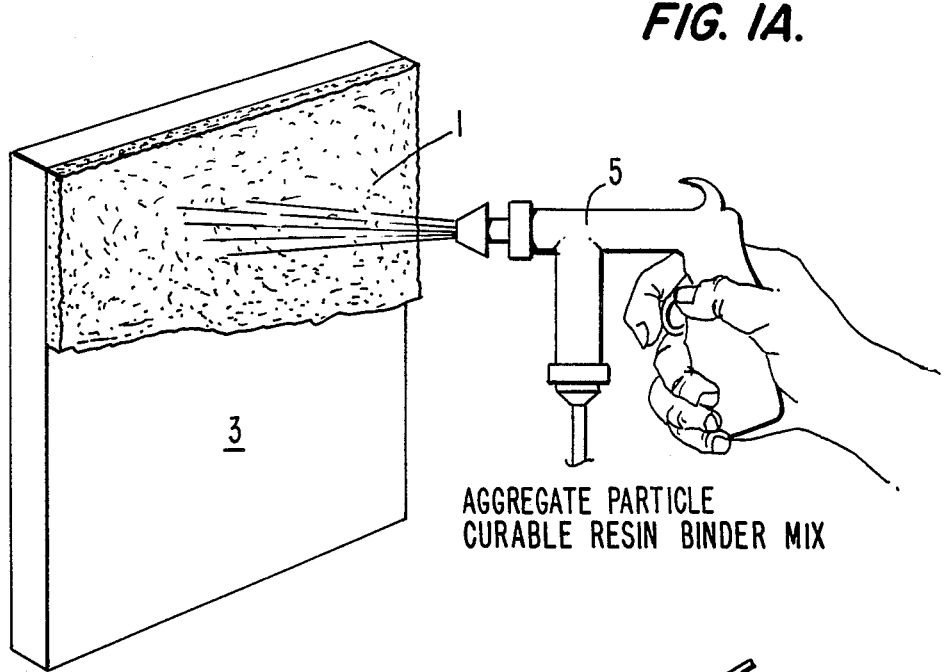

United States Patent [19]

Baskin

[11] Patent Number: 4,877,656

[45] Date of Patent: Oct. 31, 1989

[54] METHOD OF FABRICATING SIMULATED STONE SURFACES AND IMPROVED SIMULATED STONE PRODUCT

[75] Inventor: David Baskin, Duxbury, Mass.

[73] Assignee: Academy of Applied Science, Inc., Concord, N.H. ; a part interest

[21] Appl. No.: 235,702

[22] Filed: Aug. 18, 1988

Related U.S. Application Data

[63] Continuation of Ser. No. 928,270, Nov. 6, 1986, abandoned.

[51] Int. Cl.[4] .............................................. B44F 9/04
[52] U.S. Cl. ................................. 428/15; 52/309.1; 52/596; 52/612; 52/DIG. 7; 156/61; 156/245; 156/289; 428/152; 428/542.2

[58] Field of Search ................... 156/61, 245, 289; 428/15, 152, 542.2; 52/309.1, 596, 612, DIG. 7

[56] References Cited

U.S. PATENT DOCUMENTS

| | | | |
|---|---|---|---|
| 3,341,396 | 9/1967 | Iverson | 428/15 X |
| 3,515,619 | 6/1970 | Barnette | 428/15 |
| 4,385,088 | 5/1983 | Baskin | 428/15 |

*Primary Examiner*—Robert A. Dawson
*Attorney, Agent, or Firm*—Rines and Rines

[57] ABSTRACT

Novel artificial or simulated stone facing formed on a substrate with surface-cured finish conformance to the finish of the innerface of a thin flexible film air-sealed to the outer surface of the facing before curing.

9 Claims, 1 Drawing Sheet

U.S. Patent  Oct. 31, 1989  4,877,656

AGGREGATE PARTICLE
CURABLE RESIN BINDER MIX

HI-GLOSS
MIRROR SMOOTH

PATTERN
(TEXTURE EMBOSSING)

METHOD OF FABRICATING SIMULATED STONE SURFACES AND IMPROVED SIMULATED STONE PRODUCT

This is a continuation application of Ser. No. 928,270 filed Nov. 6, 1986, now abandoned.

The present invention relates to artificial rock or stone-simulating facings (hereinafter stone-like) or substrates that involve synthetic coatings for substrates which simulate natural stone blocks, panels or the like.

In general, artifical or simulated natural stone products have been customarily prepared in casts or molds. Casting and molding techniques, however, have drawbacks including the circumstance that cast or molded products are generally not finished products, and the processes are relatively costly.

U.S. Pat. No., 3,341,396, for example, discloses a process for coating a substrate with a simulated natural stone coating, but with limitations, among other facets, on geometry and orientation of surface applications.

Artificial decorative rocks have been described in my earlier U.S. Pat. No. 4,385,088, but the technique therein is not applicable to the purposes of the present invention.

The invention requires the provision of a low-cost thin-layered, artificial stone-like surface on a substrate for use as an indoor or outdoor wall or other panel facing, with controlled surface finish ranging from high-gloss mirror-smoothness to controlled and predetermined textured finishes, has not heretofore been readily available, particularly as a standard construction material.

It is an object of the present invention, accordingly, to provide a new and improved method of low-cost fabrication of artificial or simulated stone-like facings on substrates and a novel product resulting therefrom, superior to prior simulated natural stone products and processes in feel and simulation of natural stone; and also to provide standard pre-fabricated construction panels or the like with controlled surface finish, ranging from high gloss surfaces to predetermined textured, embossed or patterned surfaces.

Other and further objects will be explained hereinafter and are more particularly delineated in the appended claims.

In summary, the invention in its broader aspects embraces a method of fabricating an artificial stone-like facing as for attachment to a substrate, that comprises, preparing a mixture of a wet, soft and uncured synthetic resin binder, color pigment and filler particles and curing agent for the resin, one side of which is for attachment to a substrate; applying the mixture so that its other side presents a wet surface of irregular and uneven particles; successively and continuously pressing together by rolling pressure successive adjacent portions of the irregular and uneven surface of the wet, soft and uncured resin mixture with corresponding successive portions of a further surface (such as a flexible thin plastic sheet as where a protective surface for the facing is desired). Preferred products resulting from the method, including best modes and embodiments therefor, are hereinafter presented.

Figure 1B:
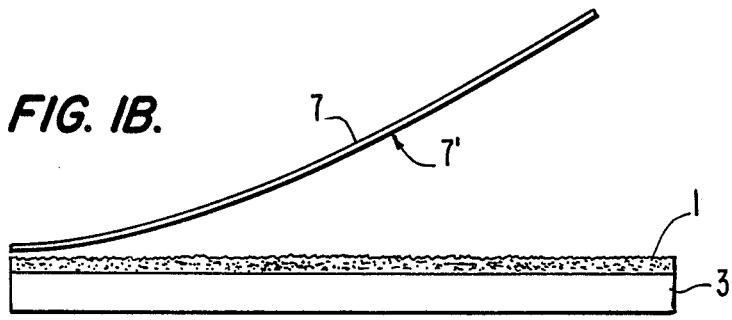
Figure 1C:
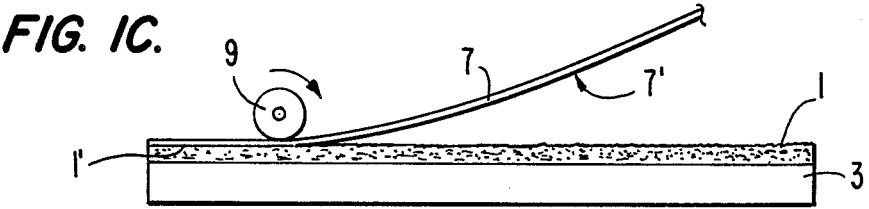
Figure 1D:
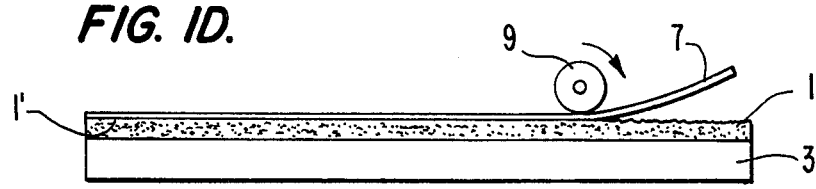
Figure 2A:
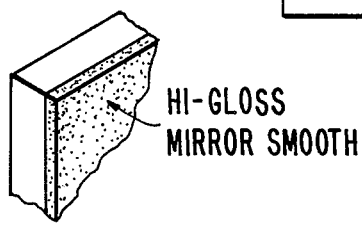
Figure 2B:
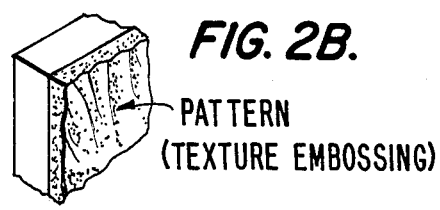

The invention will now be described with reference to the accompanying drawings in which FIGS. 1A through 1D illustrate successive method steps in fabricating the novel products of the invention; and FIGS. 2A and 2B are fragmentary isometric views of finished products, exemplarily shown with a high-gloss finish and a textured finish, respectively.

Referring to FIG. 1A, a curable synthetic resin composition or mixture including fine aggregate stone or related filler particles, as of silica, etc., as later explained is shown applied at 1 as a thin layer to a substrate 3 as of, for example, wallboard, plywood, plastic foam or other surfaces, by means of a spray gun 5. The wet fine aggregate-uncured resin binder with appropriate curing agent comprising the layer or coating mixture may also be applied to the substrate by other suitable means including trowelling, brushing, or rolling, as illustrations.

The curable synthetic resin composition useful for carrying out this invention and with which particular aggregate stone or related particles, such as silica and the like, are mixed, may have as a component a polyester, epoxy, urethane or cementitious base. Virtually any curable synthetic resinous liquid coating material may be used. The preferred coating materials are the polymerizable unsaturated polyesters such as those prepared from ethylenically unsaturated polycarboxylic acids and polyhydric alcohols. Such coating materials may also contain a copolymerizable ethylenically unsaturated compound such as styrene to make the unsaturated polyester resin more fluid and also to cross link the resin at the time of curing. In the most preferred embodiment, the primary component of the curable synthetic resin composition is PolyLite® Polyester Resin 33-031, sold by Reichhold Chemicals, Inc. of Elizabeth, NJ. PolyLite Polyester Resin 33-031 is an unsaturated polyester resin in styrene monomer and is thixotropic and prepromoted for room temperature cure with the addition of methyl ethyl ketone peroxide. Its boiling point is approximately 295° F. and its specific gravity is 1.05–1.22 at 25° C. ($H_2O=1$). It is approximately 44–48% styrene monomer and its viscosity is 350-550 (Brookfield Model LVF $3 at 60 rpm CPS).

Thickening agents may also be added to the curable synthetic resin composition to thicken the composition to a degree suitable for a particular method of application and/or suitable for application to a particular surface. For example, application by trowelling generally requires a thicker composition than application by spraying. Also, surfaces oriented vertically require a thicker composition than surfaces oriented horizontally. A composition applied to a vertically oriented surface may run or drip producing imperfections if it is too thin. Generally, a thickener is added to achieve a composition having a consistency that will not run or sag after it is applied to a particular surface. In the most preferred embodiment, CAB-O-SIL® M-5 Fumed Silica, an amorphous fumed silica, having a specific surface area of 200 plus or minus 25 square meters/gram as determined by B.E.T. method, sold by Cabot Corporation of Tuscola, Ill, is used as the thickener.

It is also desirable to add one or more matrix fillers to the composition to reduce the cost and/or influence the consistency of the composition. Matrix fillers are also used to influence the strength of the cured composition. The filler is preferably finally divided, having an average particle size falling between 10 and 325 grit. The filler may be any one of the well-recognized fillers used in the prior art including powdered talc, powdered quartz, fine silica, diatomaceous earth, gypsum, powdered glass, clay minerals such as china clay (Kaolin), illite, powdered chalk, powdered marble, powdered limestone, aluminum silicate, aliminum stearate, calcium silicate, boracite, borax, and alumina trihydrate. The latter, alumina trihydrate, is especially effective in improving the fire-resistant properties of the final product and is a preferrred filler.

The filler can contribute to the color, transparency, and surface properties of the cured composition. Therefore, it is appropriate to use different fillers when simulating different stones. For example, when simulating marble, the general criteria for the filler is one which, when homogeneously mixed into the matrix resin, produces a product which is translucent. In this manner, a depth is given to the product which helps create the appearance of marble. The amount of filler and the particle size of the filler may also influence the translucency of the final product.

It is also appropriate to dilute the composition with a solvent to provide a viscosity that is appropriate for the manner in which the composition is to be applied. Spraying, for example, requires a much less viscous composition than troweling. Thus, to achieve a viscosity suitable for spraying, a solvent is added. The solvent is selected such that it quickly evaporates. The solvents particularly adopted for use in the present invention include acetone, methyl ethyl ketone, xylene, ethynol and the like. Acetone is the preferred solvent.

Color pigment may be added to the composition so that the color of the composition has the desired background color. The color pigment is preferably an inert, inorganic, finely divided substance applied either as a dry powder or in paste form. Such color pigments are commonly known and readily available. Preferably the color pigment is a selected P.M.S. polyester-dispersed pigment, available from P.M.S. Consolidated of Somerset, NJ.

Finally, a polymerization catalyst agent or mixture of catalysts is added to the composition. Such catalysts are well-recognized in the art and usually are free radical catalysts based on a peroxide-type compound such as for example methyl ethyl ketone peroxide, benzoyl peroxide, tertiary butyl, hydroperoxide, and the like. Typically, the catalyst may be present in amounts ranging from about 0.1 to 6% by weight of the polyester resin.

The mixture of the fine particulatd aggregate stone or related particles and the synthetic resin composition thin layer 1 is coated onto the substrate 3 before the composition hardens or cures. Curing time will depend, or course, upon which resin and catalyst are chosen for the synthetic resin composition. The composition may be coated onto a wide variety of the conventional flat or curved substrates, as before indicated, including, wood, particle board, sheetrock, beaver board, pressed woods such as those sold under the trademarks "Masonite" and "Timblend", various pressed fiberboards, cardboard, paper, textile fabrics, plastic sheets, fiberglass, cement blocks, bricks, metals, or other common building materials.

In accordance with preferred applications of the present invention herein described. this coating layer 1 is made very thin, as of the order of 1/16th of an inch for internal walls and panel faces and of the order of a 16th of in inch for outside walls.

While the mixture of the fine aggregate stone or related particles and uncured resin binder is still wet, soft and uncured, in accordance with the invention a sol-forming surface, shown as a thin flexible film 7, FIG. 1B, is pressed together with the rough and uneven outer or external surface of the coated layer 1. In a preferred and best mode embodiment, particularly suitable for a highly finished or high gloss product, the thin film 7 is of high gloss mirror smooth plastic sheeting such as 10 mil transparent polyethelene. As shown in successive FIGS. 1C and 1D, a very critical technique for applying the thin flexible film surface 7 to the outer irregular surface of the coated layer 1 is illustrated at successive moments. Specifically, the successive portions of the thin film 7 from left-to-right in the drawing, are successively and continuously pressed, as by rollers 9, against corresponding successive portions of the irregular outer surface of the layer 1. This has been found to force conformance of the successive portions of the irregular outer surface of the layer 1 into substantially exact conformance with the surface finish of the inner surface 7' of the thin flexible film 7. This also, of course, forces the uncured aggregate particle-resin binder layer coating 1 against the substrate 3 (which, if porous or irregular, aids the attachment upon the hardening of the coated layer during curing). Thus in the left-hand part of FIG. 1C, the portion of the film 7 that has been pressed against the left-most outer surface of the layer 1 has caused the same to become smooth as shown at 1'—the mirror smoothness being achieved by the forced conformance with the high gloss inner surface finish 7' of the thin film 7 during this successive pressing process. This continues along the coating 1, FIG. 1D. The air between the film 7 and the uncured mixture coating layer 1 becomes evacuated so that the curing is rapid with the thin film sealed and pressed against the coating layer 1.

Prior to the application of the thin flexible film 7, a thin surface-conforming release layer is applied to the film surface at 7', as of a light spray of silicone or wax. Thus, when the layer 1 is hardened and cured, the panel $1 \propto 3$ may be shipped to a construction site for use as a wall, panel or other facing or the like with the protection of the adhered thin outer film 7 which serves as a scratch-resistant barrier, and also protects in the stacking, storage and shipment of the product. When the facing is installed, the film 7 may be release-stripped, leaving the hardened artificial stone-like facing unitarily attached to the substrate and having the external high gloss mirror smooth finish of the inner surface of the film 7.

By this technique, relatively inexpensive artificial or simulated high gloss stone facing is provided and without the expense of sanding, polishing and other finishing steps that are required of natural slabs, prior casts, molded slabs or the like. The light-weight achievable with appropriate materials in accordance with the invention is also a most desirable feature.

In the event that some pattern or texture or embossing is desired in the outer surface of the facing, such a pattern or the like may be applied to the inner surface 7' of the thin film 7 so that a conforming pattern will result in the hardened external facing surface of the product manufactured by the invention. Such a pattern is illustrated in the finished product of the fragmentary product of FIG. 2B, as distinguished from the high gloss particulate pattern (for example, simulated granite) of FIG. 2A.

A preferred formulation for fabricating products such as that of FIGS. 2A and 2B is as follows: 1 part of the epoxy resin (such as DER 331 of the Reichhold Chemical Company; ½ part of Versamed 140 epoxy hardener; 1 part CabO-Sil fumed silica (Cabot Company) and 1½ parts of silica aggregate. Coloring agents may be used in the proportion of approximately a teaspoon to two gallons of mix, to simulate some natural stones.

If desired, the coating may be applied also over the edges of the substrate (now shown) and, for example, along a marginal strip or wider area if desired on the underside thereof, with the film also applied thereover, to simulate a thick slab of cut stone.

Further modifications will occur to those skilled in this art and such are considered to fall within the spirit and scope of the invention as defined in the appended claims.

What is claimed is:

1. A method of fabricating an artificial stone-like facing attached to a substrate, that comprises, preparing a mixture of a wet, soft and uncured synthetic resin binder, color pigment and filler particles and curing agent for the resin; applying the mixture on one side to a substrate with the other side presenting a wet irregular and uneven resin surface; successively and continuously pressing together by rolling pressure successive adjacent portions of the irregular and uneven surface of the wet, soft and uncured resin mixture with corresponding successive portions of a sheet having an inner surface of predetermined smooth finish to compress the resin mixture and force the same into conformance with the successive portions of the said inner surface of the sheet throughout the same and while evacuating air therebetween ,said pressure being used to form either a flat or curved facing; curing the wet resin mixture without heat by action of said curing agent in such compressed and air-sealed condition; the sheet thereafter serving to protect the said facing until the facing is to be used, whereupon the step is performed of separating the sheet and cured mixture to release the facing with a hardened smooth artificial stone-like appearance resulting from the compression of the resin mixture and having the said finish of the said inner surface of the sheet.

2. A method of fabricating an artificial stone-like facing as for attachment to a substrate, that comprises, preparing a mixture of a wet, soft and uncured synthetic resin binder, color pigment and filler particles and curing agent for the resin, one side of which is for attachment to a substrate; applying the mixture so that its other side presents a wet surface of irregular and uneven particles; successively and continuously pressing together by rolling pressure successive adjacent portions of the irregular and uneven surface of the wet, soft and uncured resin mixture with corresponding successive portions of a further surface of predetermined smooth finish to compress the resin mixture and force the same into conformance with the successive portions of the further surface througout the same and while evacuating air therebetween , said pressure being used to form either a flat or curved facing; curing the wet resin mixture without heat by action of said curing agent in such compressed and air-sealed condition; and separating the cured mixture and further surface to release the facing with a smooth hardened artificial stone-like appearance resulting from the compression of the resin mixture and having the said finish of the said further surface.

3. A method as claimed in claim 2 and in which the uncured synthetic resin binder is selected from the group consisting of polymerizable unsaturated polyester resins, with and without styrene monomers, epoxy resins, and urethane resins; said filler particles are selected from the group consisting of silica, powdered talc, powdered quartz, diatomaceous earth, gypsum, powdered glass, clay minerals, illite, powdered chalk, powdered marble, powdered limestone, aluminum silicate, aluminum stearate, calcium silicate, boracite, borax and alumina trihydrate; said color pigments are selected from the group consisting of inert inorganic powders and pastes, and polyester-dispersed pigments; and said curing agent is selected from the group consisting of polymerzation catalysts including free radical catalysts based on peroxide-type compounds, methyl ethyl ketone peroxide, benezoyl peroxide and tertiary butyl hydroperoxide.

4. A method as claimed in claim 2 and in which the artificial stone is to simulate smooth marble, and said filler is selected in amount and particle size such that, when homogeneously mixed into the resin binder and after compression thereof, produces a depth-like translucency.

5. A method as claimed in claim 2 and in which the cured mixture facing is unitarily attached on its said one side to a substrate, covering one or more of the substrate topside, edges and areas of the underside.

6. An artificial stone-like facing unitarily carried on a substrate and fabricated by the method of claim 2.

7. A substrate-carrying artificial stone-like facing as claimed in claim 6 and in which the facing surface is one of high gloss and patterned finish.

8. An artificial stone-like smooth facing that comprises a layer of cured mixture of polyester resin, polyester-dispersed pigment and aluminum trihydrate filler, pressure-applied when wet and uncured against and throughout a predetermined high gloss smooth surface to conform to the high gloss smooth finish thereof and the cured without heat against said surface and released therefrom.

9. An artificial stone-like facing attached to one or more of the topside, edges and areas of the underside of a substrate, and comprising a layer(s) of cured mixture of initially uncured wet and soft synthetic resin binder, color pigment, filler particles and curing agent, said resin being selected from the group consisting of polymerizable unsaturated polyester resins, with and without styrene monomers, epoxy resins and urethane resins; said color pigments being selected from the group consisting of inert inorganic powders and pastes and polyester-dispersed pigments; and said filler particles being selected from the group consisting of powdered silica, silicates, quartz earths and clays and aluminum trihydrate; said layer(s) of cured mixture having been pressure-applied when wet and uncured and compressed against a predetermined smooth surface of high gloss to conform to and the smooth finish of said surface and then cured without heat against and throughout said surface and released therefrom.

* * * * *